United States Patent
Thibault

(10) Patent No.: US 6,199,511 B1
(45) Date of Patent: Mar. 13, 2001

(54) ROTARY LIVESTOCK FEEDER WITH FEED RATE GAUGE

(75) Inventor: Ronald M. Thibault, Osborne, KS (US)

(73) Assignee: Osborne Industries, Inc., Osborne, KS (US)

( * ) Notice: Subject to any disclaimer, the term of this patent is extended or adjusted under 35 U.S.C. 154(b) by 0 days.

(21) Appl. No.: 09/350,252

(22) Filed: Jul. 8, 1999

(51) Int. Cl.⁷ ...................................................... A01K 5/00
(52) U.S. Cl. ............................................. 119/53; 119/53.5
(58) Field of Search .......................... 119/53, 53.5, 52.1, 119/54

(56) References Cited

U.S. PATENT DOCUMENTS

| | | | |
|---|---|---|---|
| 4,353,329 | 10/1982 | Thibault | 119/53.5 |
| 4,385,591 | * 5/1983 | Petersen | 119/53.5 |
| 4,433,641 | * 2/1984 | Waite | 119/53 |
| 4,462,338 | 7/1984 | Thibault | 119/53.5 |
| 4,729,344 | * 3/1988 | Winkel | 119/53.5 |
| 5,007,380 | * 4/1991 | Badia et al. | 119/53 |
| 5,069,164 | * 12/1991 | Wiwi | 119/53 |
| 5,092,274 | * 3/1992 | Cole et al. | 119/57.4 |
| 5,245,949 | 9/1993 | Hively | 119/53 |
| 5,603,285 | * 2/1997 | Kleinsasser | 119/53 |
| 5,921,200 | * 7/1999 | Bondarenko et al. | 119/52.1 |

* cited by examiner

Primary Examiner—Charles T. Jordan
Assistant Examiner—Yvonne R. Abbott
(74) Attorney, Agent, or Firm—Jeffrey L. Thompson; Thompson & Thompson, P.A.

(57) ABSTRACT

A feeder for dispensing feed to livestock which includes a trough having a surface adapted to receive the feed thereon, and a hopper positioned above the trough surface. The hopper has a bottom with an aperture therethrough and a side wall. A feed wheel is rotatably mounted on the trough and includes a radially extending spoke engageable by livestock. A deflector cone having an upwardly tapering cross-sectional configuration is positioned in the hopper and includes a lower edge positioned above the hopper bottom and terminating inwardly of the hopper side wall and outwardly of the hopper bottom aperture. A sweep member is positioned below the deflector cone lower edge and adapted for sweeping feed in the hopper to the aperture. An adjustment mechanism is provided for suspending the deflector cone above the hopper bottom and adjusting a spacing between the lower edge of the deflector cone and the hopper bottom. The adjustment mechanism includes a rigid connector extending between an adjustment bolt and the deflector cone, and a feed rate gauge secured to the adjustment bolt to provide a quick and accurate adjustment of the flow rate of feed through the feeder.

20 Claims, 4 Drawing Sheets

ROTARY LIVESTOCK FEEDER WITH FEED RATE GAUGE

BACKGROUND OF THE INVENTION

1. Field of the Invention

The present invention relates generally to livestock feeders. In particular, the present invention relates to a rotary feeder operated by livestock which dispenses feed at an adjustable flow rate and uses a feed rate gauge to keep the flow rate uniform and accurate.

2. Description of the Related Art

A variety of livestock feeder designs have been developed in the animal husbandry field in an attempt to achieve accurate and reliable metering of feed with minimal waste. One of the most widely used feeder designs in the industry today is a rotary livestock feeder developed by the present applicant, which is described in the Applicant's prior U.S. Pat. No. 4,462,338.

The rotary livestock feeder disclosed in the Applicant's U.S. Pat. No. 4,462,338, provided a simple, dependable, easily adjustable, and relatively inexpensive construction. This conventional rotary livestock feeder provided significant advantages over earlier feeder designs in that feed waste was minimized by dispensing only such amounts of feed as can be readily consumed by livestock, a constant feed flow rate is maintained regardless of feed level in the hopper, and mixing action of the feed wheel deters livestock from wasteful sorting of the ration. These advantages and others have been recognized throughout the industry and have made the Applicant's rotary livestock feeder one of the most widely used livestock feeders for many years.

However, the conventional rotary livestock feeder is relatively difficult to adjust accurately and uniformly to compensate for different types of feed. For example, in a large swine feeding operation, several rotary livestock feeders are often used to dispense a particular type of feed at any given time. As the feed needs of the animals change, the feeders may be filled with a feed having a different consistency, moisture content, angle of repose, and so forth, which requires an adjustment of the metering mechanism within the feeder to provide an optimum feed rate.

The conventional rotary feeders have an adjustment mechanism for changing the vertical spacing of a deflector cone within the feed hopper above the hopper bottom using a threaded adjustment bolt connected to the deflector cone with a flexible cable. However, the conventional rotary feeders do not have a means for providing a visual indication of the vertical position of the deflector cone, nor a means for allowing a group of feeders containing the same type of feed to be quickly and easily adjusted to a uniform feed rate setting. Thus, it has been difficult and time consuming to adjust a group of feeders to a uniform feed rate setting each time the feed content changes. This has led to a reluctance on the part of users to change the feed rate settings of a group of feeders each time the feed content changes, which often results in use of the feeders with a less than optimum feed rate setting.

Another problem with the conventional rotary livestock feeders has resulted from the use of a flexible cable to suspend the deflector cone within the hopper above the bottom discharge opening of the hopper. The flexible cable tended to wind and buckle during use, thereby causing the vertical positioning of the deflector cone to be unpredictable and allowing the deflector cone to fall off of the shaft that supports and centers it at the bottom of the hopper.

Thus, there has been a need in the industry for an improved rotary livestock feeder that facilitates accurate and uniform adjustment of the feed rate setting, and eliminates the problems associated with the use of a flexible cable to suspend the deflector cone within the hopper of the feeder.

SUMMARY OF THE INVENTION

It is an object of the present invention to provide an improved rotary livestock feeder that solves the problems with the conventional livestock feeders described above.

More specifically, the principal objects of the present invention are: to provide a livestock feeder that has all of the advantages of the rotary livestock feeder disclosed in the Applicant's prior U.S. Pat. No. 4,462,338; to provide a rotary livestock feeder that has a feed rate gauge that allows quick and easy adjustment of the feeder to an accurate and uniform feed rate setting; to provide a rotary livestock feeder that has a rigid connecting structure for suspending a deflector cone from an adjustment mechanism to prevent variations in feed rate settings due to winding and buckling of the connecting structure; and to provide such a feeder that is economical to manufacture, efficient in use, capable of a long operating life, and particularly well adapted for the proposed use.

In order to realize the objects and advantages set forth above, the applicant has developed an improved, rotary livestock feeder that has a feed rate gauge for obtaining an accurate and uniform flow rate through the feeder. The improved rotary livestock feeder is similar to the rotary livestock feeder disclosed in the Applicant's U.S. Pat. No. 4,462,338, except that the adjustment mechanism has been changed to incorporate a feed rate gauge, and a rigid connector structure is provided in place of the flexible cable for connecting an adjustment bolt of the adjustment mechanism to the conical deflector. These changes to the Applicant's rotary livestock feeder provide substantial improvements and advantages over the existing feeder designs.

The feed rate gauge of the present invention is arranged to provide a visual indication of the vertical spacing between the deflector cone and the hopper bottom, thereby allowing the feed rate setting of the feeder to be quickly and easily adjusted to a desired setting. The feed rate gauge allows the feed rates of several rotary feeders to be quickly adjusted to the same feed rate setting to obtain uniform feeding rates among the feeders for a given type of feed. The feed rate gauge can be easily calibrated by moving an L-shaped plate containing visual indicia for the gauge along the length of a threaded adjustment bolt to a desired setting.

The rigid connector structure of the present invention provides a substantial improvement over the flexible cables used in existing rotary livestock feeders because it does not wind or buckle during use and allows a more accurate and uniform adjustment of the feed rate.

According to a broad aspect of the present invention, a feeder for dispensing feed to livestock is provided, comprising: a hopper including a side wall and a bottom having a feed discharge aperture therethrough; a deflector cone mounted in the hopper in vertically spaced relationship over the hopper bottom; an adjustment mechanism operably associated with the deflector cone for adjusting the vertical spacing thereof over the hopper bottom, whereby the rate of flow through the feeder is dependent upon the vertical spacing between the deflector cone and the hopper bottom; and a feed rate gauge operably associated with the adjustment mechanism, the feed rate gauge being arranged to provide a visual indication of the vertical spacing between the deflector cone and the hopper bottom.

The adjustment mechanism comprises a threaded member operably connected to the deflector cone. The feed rate gauge comprises a plate member fixed to the threaded member that contains visual indicia indicative of a feed rate setting. The plate member is movable with the threaded member as the vertical spacing of the deflector cone over the hopper bottom is adjusted. A cross-piece extends across the hopper, and the threaded member extends through an opening in the cross-piece. A portion of the cross-piece is disposed between a portion of the plate member containing the visual indicia such that the cross-piece provides a stationary reference mark for the feed rate gauge.

The adjustment mechanism comprises a handle having a threaded aperture threadably engaged on the threaded member. The handle has a grip portion disposed above the plate member adapted to be rotated by a user to effect vertical adjustment of the deflector cone. The plate member has a surface facing the cross-piece which is slidably engaged by the cross-piece to maintain a proper orientation of the visual indicia and to prevent rotation of the threaded member during operation of the adjustment mechanism.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A rotary livestock feeder with a feed rate gauge according to a preferred embodiment of the present invention will now be described in detail by reference to FIGS. 1 to 4 of the accompanying drawings.

Figure 1:
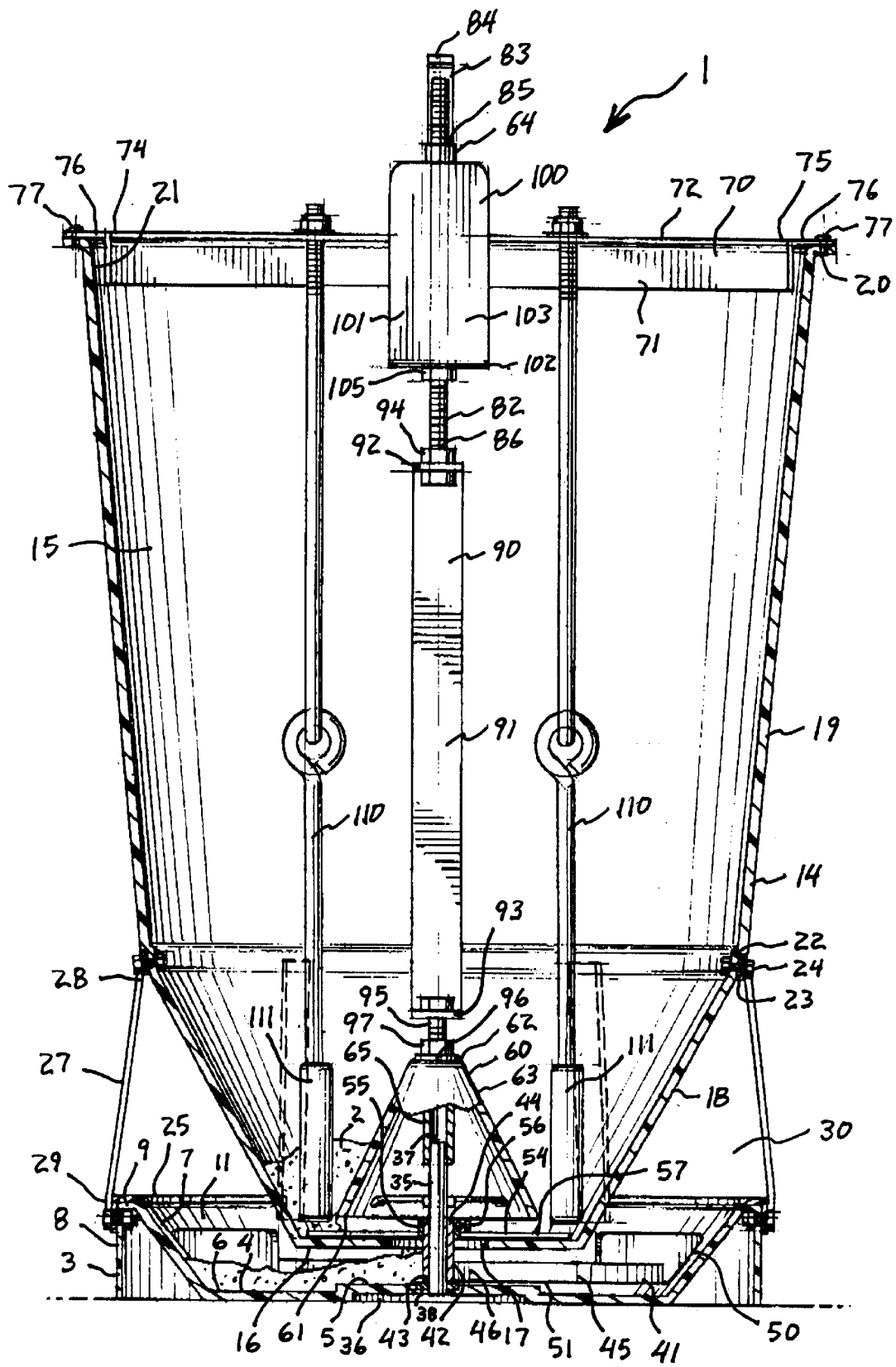
FIG. 1 is a vertical cross-sectional view of a rotary livestock feeder embodying the present invention.
Figure 2:
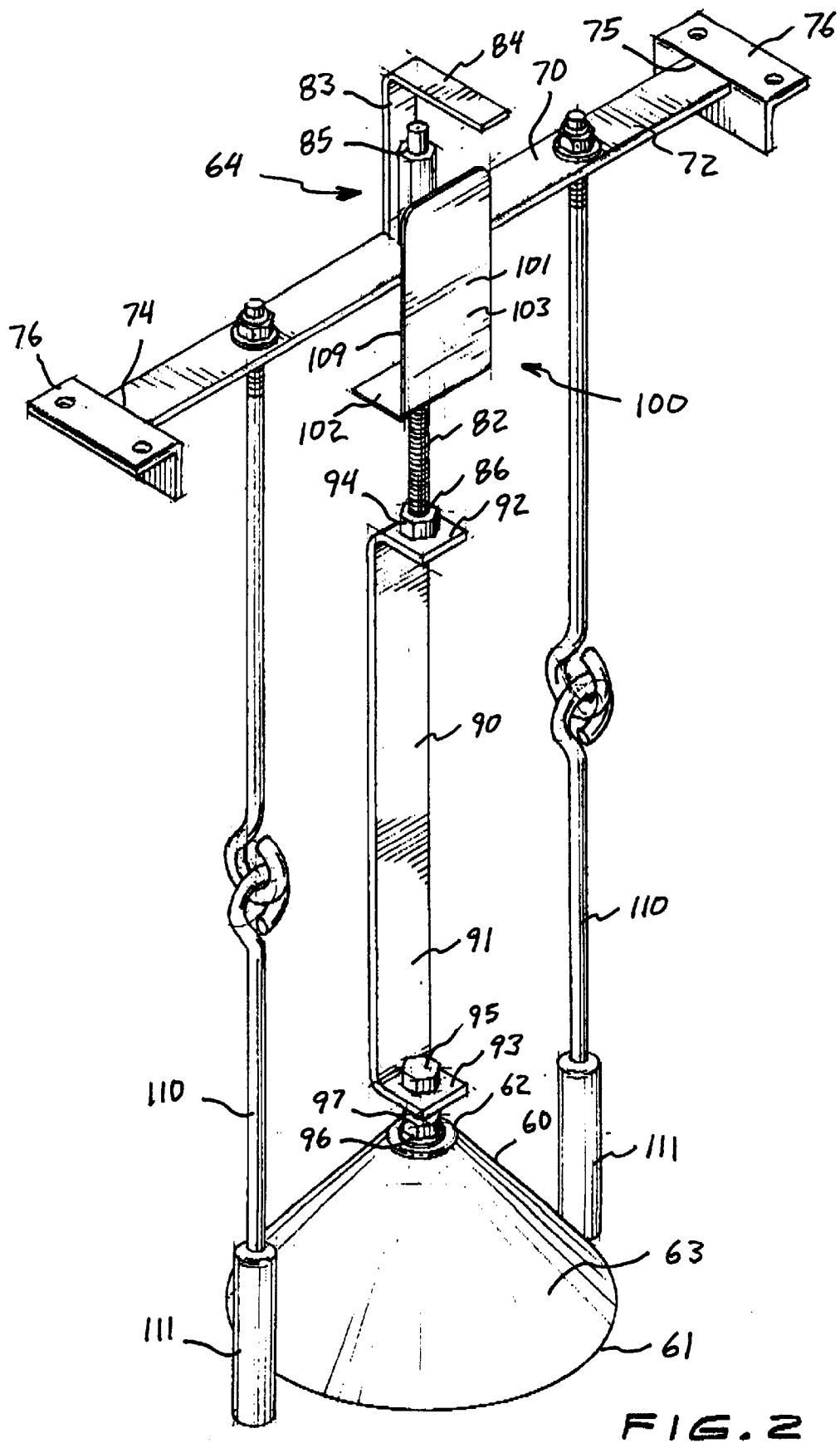
FIG. 2 is a perspective view of the deflector cone, adjustment mechanism, and feed rate gauge of the present invention.
Figure 3:
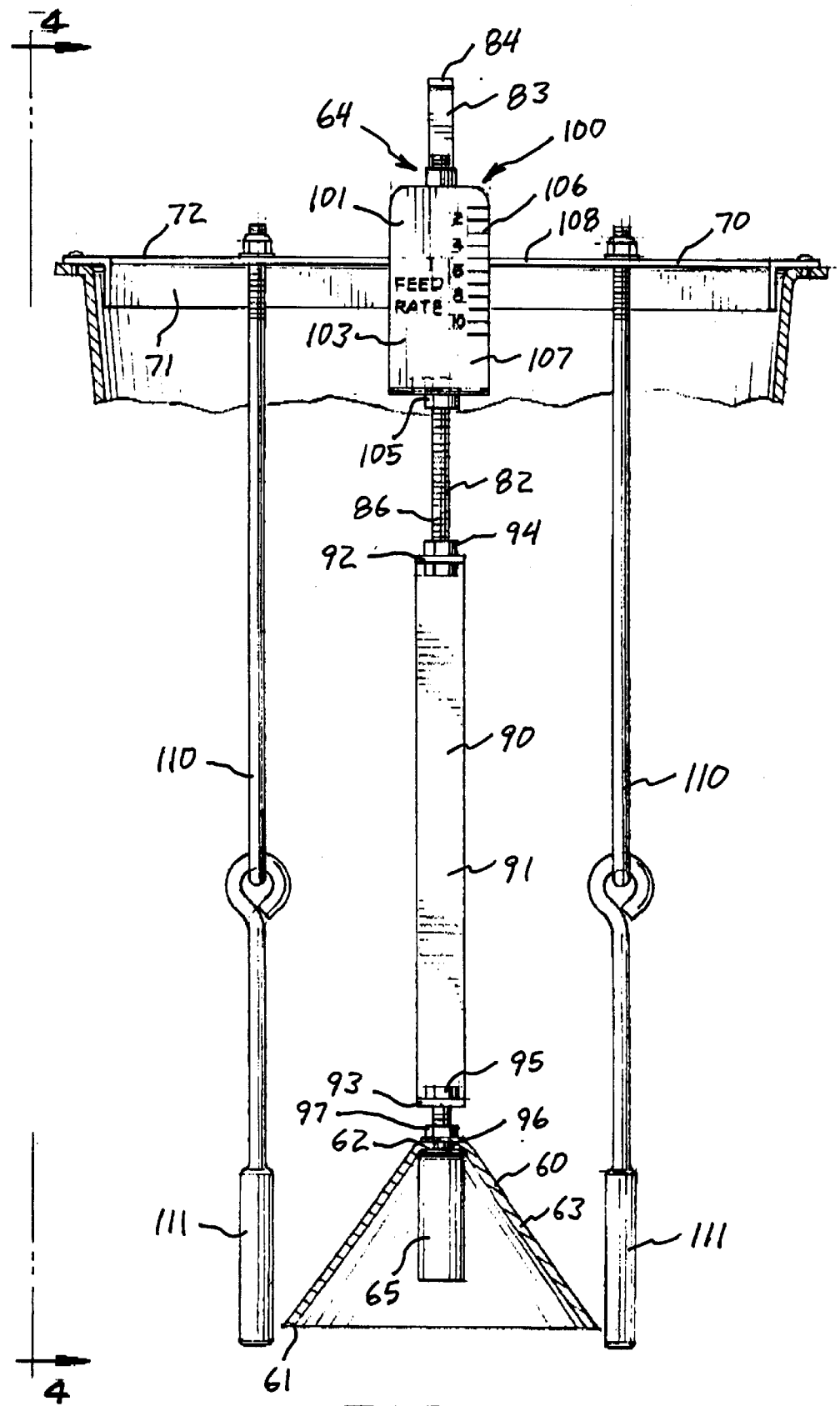
FIG. 3 is a front view of the deflector cone, adjustment mechanism, and feed rate gauge shown in FIG. 2.
Figure 4:
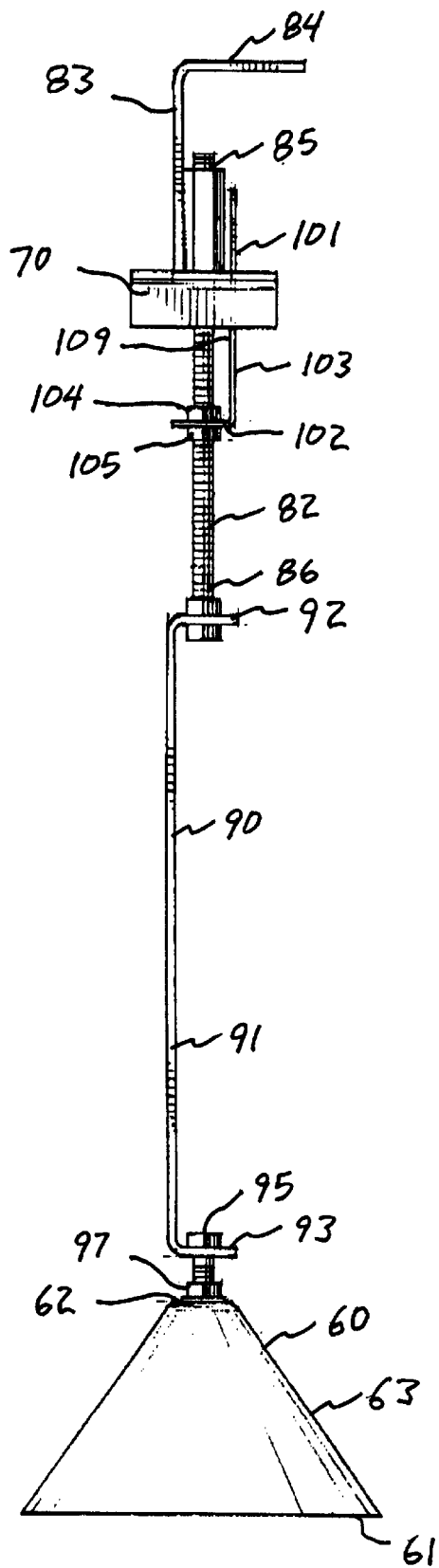
FIG. 4 is a side view of the deflector cone, adjustment mechanism, and feed rate gauge, as viewed along line 4—4 in FIG. 3.

As shown in FIG. 1, reference numeral 1 generally designates a feeder for dispensing feed 2 to livestock. The feeder 1 comprises a generally circular trough or base member 3 having an upper surface 4 for receiving the feed 2 thereon and having inner and outer portions 5 and 6, respectively. The inner portion 5 is slightly raised above the level of the outer portion 6. The trough 3 also includes generally circular inner and outer side walls 7 and 8, respectively, terminating at an upper edge 9. The upper surface 4 and inner side wall 7 of the trough 3 define a feed receptacle 11 for containing the feed material 2 therein and allowing livestock access thereto.

A generally cylindrical hopper 15 is positioned above the trough upper surface 4 and generally concentric with the trough 3. The hopper 15 comprises a bottom 16 having an aperture 17 through the center thereof and a side wall 14. The side wall 14 forms a frustoconical lower portion 18 and an upper portion 19 which is also frustoconical but has less taper than the lower portion 18. The hopper upper portion 19 terminates in an upper edge 20 that defines a mouth 21 through which the feed 2 may be introduced into the hopper 15. A cover (not shown) may be removably positioned over the mouth 21 of the hopper 15 in engagement with its upper edge 20 to protect the contents of the hopper 15.

The lower and upper portions 18 and 19 of the hopper 15 are integrally connected at a shoulder 22 which is adapted to receive a support ring 23 attached to the hopper 15 by bolts 24. A trough support ring 25 has an angular cross-sectional configuration and is mounted on the trough by bolts 26 in covering relation over the upper edge 9. The trough support ring 25 is preferably formed of metal and prevents livestock from biting the trough upper edge 9. A plurality of radially spaced support members 27 have upper and lower ends 28 and 29 welded or otherwise suitably attached to the hopper and trough support rings 23 and 25, respectively. The support members 27 thereby support the hopper 15 in a predetermined spacing above the trough upper surface 4. The support members 27 also function to define a plurality of radially oriented feeding stations 30 whereat livestock may access the feed material 2 and are separated by the support members 27.

An axle 35 is attached to the trough 3 by means of a plate 36. The axle 35 extends upwardly from the inner portion 5 of the trough upper surface 4 in a direction substantially normal thereto and terminates in an upper end 37. A washer 38 is positioned over the axle 35 and engages the trough upper surface 4.

A feed wheel 41 is rotatably mounted in the feed receptacle 11 and comprises a plurality of radially extending spokes 45. The spokes 45 each terminate in a respective angled distal edge 50 which is closely spaced with respect to the inner side wall 7 of the base member 3. As an example, four horizontally extending spokes 45 can be radially spaced at approximately 90 degree intervals about the feed wheel 41. It will be appreciated that any appropriate number of spokes 45 may be utilized in the practice of the present invention. An odd number of spokes 45, such as five, can be used with an even number of support members 27, such as six, or vice versa, to ensure that at least some of the spokes 45 are always readily accessible within the feeding stations 30 for movement by the animals.

The spokes 45 are each welded or otherwise suitably attached at their respective proximate portions 46 to an upright member 42. The upright member 42 terminates in opposite lower and upper ends 43 and 44, respectively, and is rotatably received on the axle 35. The lower end 43 of the upright member 42 bears on and is rotatable with respect to the washer 38, whereby a respective lower edge 51 of each spoke 45 is positioned slightly above the trough upper surface inner portion 5 and slightly higher above the trough upper surface outer portion 6.

The upright member 42 extends through the hopper bottom aperture 17 coaxially with the hopper 15. A feed sweep 54 is mounted thereon slightly below the upright member upper end 44. The feed sweep 54 includes a collar 55 fixedly mounted on the upright member 42 by a screw 56 and a pair of diametrically opposed, radially extending feed sweep members 57 welded or otherwise suitably attached to the collar 55 and positioned immediately above the hopper bottom 16. The set screw 56 may be loosened whereby the collar 55 is axially vertically slidable with respect to the upright member 42 and the position of the feed sweep 54 within the hopper 15 may be adjusted. Each feed sweep member 57 terminates at an outer end 58 in close spaced relation to the side wall 14 of the hopper 15.

A deflector cone 60 is positioned in the hopper 15 and has a configuration substantially defining a right cone with a circular lower edge 61, an apex 62, and a side wall 63. A guide 65 is mounted within the deflector cone 60 and includes a tubular member having an open bottom end for receiving the axle 35. The guide 65 is adapted to vertically slidably receive the axle 35, whereby the deflector cone 60 is maintained substantially centered within the hopper 15 with its lower edge 61 positioned outwardly of the periphery of the hopper bottom aperture 17 and inwardly of the hopper sidewall 14.

The cross-sectional configuration of the deflector cone 60 defines an "apex angle" with the side wall 63 at the apex 62, and a "base angle" at the deflector cone lower edge 61 with the side wall 63 with respect to the horizontal. To facilitate feed 2 sliding down the deflector cone side wall 63, the deflector cone apex angle is preferably less than twice the angle of repose of the feed 2. Therefore, the base angle is greater than the angle of repose of the feed 2. For example, an apex angle of 80 degrees and a corresponding base angle of 50 degrees has been found to be particularly well suited for use with most feeds 2.

An adjustment mechanism 64 is provided for vertically moving the deflector cone 60 within the hopper 15 and thereby controlling the annular cross-sectional volume of the feed 2 being contacted by the feed sweep members 57 as they rotate. The rate of feed flow through the hopper bottom aperture 17 may thus be adjusted, as will be explained in more detail hereinafter.

The adjustment mechanism 64 is attached to the hopper 15 by an angle-shaped cross-piece 70 having a downwardly extending leg 71 connected to a horizontally extending leg 72 and opposite first and second ends 74 and 75. A pair of angle brackets 76 are each attached to a respective end 74, 75 of the cross-piece 70 and are adapted for attachment to the upper edge 20 of the hopper 15 by screws 77, whereby the cross-piece 70 is positioned diametrically across the mouth 21 of the hopper 15.

The horizontally extending leg 72 of the cross-piece 70 has an aperture 81 through the center thereof adapted to slidably, but not threadably, receive the shaft of a threaded adjustment bolt 82. A handle 83 has a grip portion 84 and a threaded aperture 85 threadably engaged on the threaded shaft of the adjustment bolt 82.

A rigid linkage comprising an elongated connector 90 connects a lower end 86 of the threaded adjustment bolt 82 to the deflector cone 60. The connector 90 comprises a rigid flat metal member 91 having upper and lower horizontal flanges 92, 93 formed at each end, respectively, and an opening extending vertically through each of the flanges 92, 93. The adjustment bolt 82 passes through the opening in the upper flange 92 of the connector 90 and is secured to the upper flange 92 by a threaded nut 94 located on an upper side of the upper flange 92. A second bolt 95 extends through the opening in the lower flange 93 of the connector 90 and into threaded engagement with a threaded aperture 96 in an upper end of the guide 65. A threaded nut 97 located on an upper side of the deflector cone 60 provides a secure attachment of the second bolt 95 to the deflector cone 60.

The connection between the second bolt 95 and the connector 90 is such that rotational movement is allowed between the deflector cone 60 and the connector 90. The deflector cone 60 is thereby suspended from the cross-piece 70 by the adjustment bolt 82, the rigid connector 90, and the second bolt 95. Thus, vertical movement of the adjustment bolt 82 causes a corresponding vertical movement of the deflector cone 60 to adjust a spacing of the deflector cone 60 above the bottom 16 of the hopper 15.

The rigid connector 90 provides a substantial improvement over the flexible steel cables used in prior art rotary livestock feeders because it does not wind or buckle during use, and thus allows a more accurate and uniform adjustment of the feed rate.

The position of the deflector cone 60 may be vertically adjusted within the hopper 15 by turning the handle 83 relative to the adjustment bolt 82, whereby the deflector cone 60 will be either raised or lowered with respect to the bottom 16 of the hopper 15, depending upon which direction the handle 83 is turned. As the deflector cone 60 is raised and lowered, the guide 65 slides vertically along the axle 35 positioned in its aperture 68, whereby the deflector cone 60 is maintained substantially centered within the hopper 15 with its lower edge 61 positioned outwardly of the periphery of the aperture 17 in the hopper bottom 16.

A feed rate gauge 100 is operably associated with the adjustment mechanism 64 to provide a visual indication of the vertical spacing between the deflector cone 60 and the hopper bottom 16. The feed rate gauge 100 comprises a generally L-shaped plate 101 having a horizontal first leg 102 with a hole through which the adjustment bolt 82 extends, and a vertical second leg 103 extending upwardly from the first leg 102. The L-shaped plate 101 is secured to the adjustment bolt 82 using threaded nuts 104, 105 positioned above and below the horizontal first leg 102, respectively. The L-shaped plate 101 is movable with the adjustment bolt 82 relative to the cross-piece 70 as the vertical spacing of the deflector cone 60 over the hopper bottom 16 is adjusted using the threaded handle 83. The grip portion 84 of the handle 83 extends upwardly a sufficient distance above the top of the L-shaped plate 101 to be comfortably gripped and rotated by a user's fingers without interference from the L-shaped plate 101.

Visual indicia 106, such as lines and alphanumeric characters, are placed on an outwardly facing flat surface 107 of the second leg 103. An edge portion 108 of the cross-piece 70 disposed between the adjustment bolt 82 and the second leg 103 of the L-shaped plate 101 provides a stationary reference mark for the feed rate gauge 100. By viewing the feed rate gauge 100 in the direction shown in FIG. 3, a feed rate setting can be observed using the edge portion 108 as a reference mark. For example, the feed rate setting shown in FIG. 3 can be read as "5" The feed rate gauge 100 can be easily calibrated by loosening the threaded nuts 104, 105, moving the L-shaped plate 101 along the length of the threaded adjustment bolt 82 to a desired setting, and retightening the nuts 104, 105. For example, the L-shaped plate 101 can be moved to a position that shows a feed rate setting of "0" when the deflector cone 60 is in its lowest position. By calibrating several of the feeders in this same way, the feed rate setting shown on the feed rate gauge 100 will be uniform among the feeders, thereby allowing uniform feeding rates when the feed rate gauges on the feeders are all set to the same feed rate settings. A back side 109 of the L-shaped plate 101 facing the cross-piece 70 is slidably engaged by the cross-piece 70 to help maintain a proper orientation of the visual indicia 106 and prevent rotation of the L-shaped plate and the adjustment bolt 82 when the handle 83 is rotated.

A pair of pendulum members 110 are also suspended from the cross-piece 70 and extend downwardly into the hopper 15 so that the lower ends 111 are engaged by the sweep members 57 during operation. The pendulum members 110 function to agitate the feed 2 within the hopper 15 as the sweep members 57 are rotated into engagement with their lower ends 111.

In use, the feeder 1 automatically delivers the feed 2 when operated by livestock at a continuous flow rate regardless of the level of the feed 2 in the hopper 15. Furthermore, the flow is self-limiting whereby additional quantities of the feed 2 are not dispensed until the feed present in the receptacle 11 is consumed.

The feed 2 is introduced into the hopper 15 through its open mouth 21, and an annular volume thereof is deposited on the hopper bottom 16 below the deflector cone lower edge 61. This annular volume of the feed 2 assumes an angle of repose between the hopper bottom 16 and the deflector cone lower edge 61. Preferably, the deflector cone 60 is positioned whereby the feed angle of repose is greater than an angle formed by a line extending from the hopper bottom aperture 17 to the deflector cone lower edge 61 with respect to the horizontal. Thus, the annular volume of the feed 2 terminates outwardly of the bottom aperture 17 of the hopper 15, and a flow therethrough induced by gravity alone is prevented. An important feature in the operation of the hopper 1 when properly adjusted is that the feed 2 will only flow from the hopper 15 when induced by livestock action, i.e., turning the feed wheel 41.

Livestock for which the feeder 1 is designed, especially swine, readily learn to rotate the feed wheel 41 by engaging the spokes 45 with their snouts. The outer ends 58 of the feed sweep members 57 extend into the annular volume of the feed material 2 and convey or spiral it to the hopper bottom aperture 17. As the feed sweep 54 is thus rotated, the feed 2 positioned above the deflector cone lower edge 61 is undercut and flows downwardly to replace the annular volume of the feed 2 which is conveyed to the hopper bottom aperture 17. Because of the relative positioning of the deflector cone lower edge 61 above the feed sweep 54 and the rod outer ends protruding therebeyond, a continuous supply of the feed 2 is maintained in the annular volume exposed to the action of the feed sweep 54.

The deflector cone 60 serves three main functions in the operation of the feeder 1. First, the feed 2 in the hopper 15 is deflected downwardly toward the periphery of the hopper bottom 16 to form the annular volume exposed to the feed sweep 54. The base angle of the deflector cone 60 being greater than the feed angle of repose, the feed 2 readily slides down the deflector cone side wall 63, and adhesion of the feed 2 to the deflector cone side wall 63 is thus minimized.

Second, the deflector cone 60 functions to support most of the weight of the feed 2 in the hopper 15. Otherwise, substantially the entire weight of the feed 2 would be directed against the hopper bottom aperture 17. By supporting and distributing the weight, problems associated with the feed material packing tightly together and bridging under pressure are minimized, ensuring a continuous flow past the deflector cone 60. The rate of feed flow has been found to be substantially independent of the feed level in the hopper 15 because such flow is caused by the feed sweep 54 and is not totally dependent upon gravity. Thus, livestock can be assured an even rate of feed flow for the same amount of effort in operating the feeder 1 as the hopper 15 empties. As an additional benefit of supporting the feed 2 with the deflector cone 60, the feed sweep 54 turns mostly within the void beneath the deflector cone 60 and resistance to its rotation is relatively unaffected by the fullness of the hopper 15. Thus, different sized animals in a group may operate the feeder 1, and discrimination against smaller animals is avoided. Providing adequate amounts of feed 2 to animals of all sizes is important to minimize size variation within a livestock group as growth occurs.

By supporting the feed weight with the deflector cone 60 a "first-in, first-out" movement of the feed 2 through the bin 15 is effected. Otherwise, the feed 2 would tend to be dispensed first at areas where the greatest downward force is encountered (i.e., directly above the hopper bottom aperture). Feed material adjacent the hopper side wall 14 would thus be the last to be expelled and would be subjected to spoilage and stagnation. Because the deflector cone 60 supports feed 2 in the hopper 15 and directs it outwardly to be undercut by the feed sweep 54, a first-in, first-out feed movement is achieved.

The third function of the deflector cone 60 is to provide a simple, reliable adjustment of the flow rate. Vertically moving the deflector cone 60 with the adjustment mechanism 64 functions to vary the annular volume of the feed 2 beneath the deflector cone lower edge 61. For example, raising the deflector cone 60 increases this volume and moves its inner edge closer to the hopper bottom aperture 17, thus providing the feed sweep members 57 with a larger bite of the feed 2. Although the deflector cone 60 may be raised high enough that the feed 2 will flow by gravity through the hopper bottom aperture 17, preferably it is maintained sufficiently close to the hopper bottom 16 that feed flow will not occur unless the feed sweep 54 is rotated. It has been found that the feed flow rate is directly and linearly proportional to the distance of the deflector cone lower edge 61 from the hopper bottom 16. Thus, the feeder 1 can be relatively accurately adjusted for a desired flow rate and, as previously described, the rate thus established will remain constant.

The deflector cone 60 also may be moved upwardly for a feed material having a relatively steep angle of repose, thereby allowing feed to flow past the deflector cone lower edge 61 to the hopper bottom 16 to an extent equal to that attained by a feed material with a relatively less steep angle of repose. The annular cross-sectional feed volume being contacted by the feed sweep members 57 as they rotate may thus be maintained, and relatively constant flow rates achieved with different feed materials.

The feed rate gauge 100 associated with the adjustment mechanism 64 allows a quick and accurate adjustment of the vertical position of the deflector cone 60 when feed material having a different angle of repose is placed in the hopper 15. Thus, a plurality of feeders can be quickly and uniformly adjusted to the same feed rate setting, increasing the efficiency of a livestock feeding operation.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. A feeder for dispensing feed to livestock, comprising:
   a hopper including a side wall and a bottom having a feed discharge aperture therethrough;

a deflector cone mounted in said hopper in vertically spaced relationship from said hopper bottom;

an adjustment mechanism operable associated with the deflector cone for adjusting the vertical spacing thereof from said hopper bottom, whereby the rate of flow through the feeder is dependent upon said vertical spacing between the deflector cone and the hopper bottom; and a feed rate gauge operably associated with said adjustment mechanism, said feed rate gauge comprising a plate member containing visual indicia indicative of a feed rate setting, said plate member being arranged to provide a visual indication of the vertical spacing between the deflector cone and the hopper bottom.

2. The feeder according to claim 1, wherein said adjustment mechanism comprises a threaded member operable connected to said deflector cone, and said plate member is fixed to said threader member, said plate member being movable with said threaded member as the vertical spacing of the deflector cone over the hopper bottom is adjusted.

3. The feeder according to claim 2 further comprising a cross-piece extending across said hopper, and wherein said threaded member extends through an opening in said cross-piece.

4. The feeder according to claim 3, wherein a portion of said cross-piece is disposed adjacent to a portion of said plate member containing said visual indicia, whereby said cross-piece provides a stationary reference mark for said feed rate gauge.

5. The feeder according to claim 3, wherein said adjustment mechanism comprises a handle having a threaded aperture threadably engaged on the threaded member, said handle having a grip portion disposed above said plate member adapted to be rotated by a user to effect vertical adjustment of said deflector cone.

6. The feeder according to claim 5, wherein said plate member has a surface facing said cross-piece which is slidably engaged by said cross-piece to maintain a proper orientation of said visual indicia and to prevent rotation of said threaded member.

7. The feeder according to claim 1, wherein said adjustment mechanism comprises a threaded member operably connected to said deflector cone, and wherein said plate member comprises a generally L-shaped plate having a first leg fixed to said threaded member and a second leg extending upwardly from said first leg and containing said visual indicia indicative of a feed rate setting, said L-shaped plate being movable with said threaded member as the vertical spacing of the deflector cone over the hopper bottom is adjusted.

8. The feeder according to claim 7, wherein said first leg of said L-shaped plate extends generally horizontal and perpendicular to said threaded member and has a hole through which said threaded member extends, and said second leg of said L-shaped plate extends generally upwardly and perpendicular to said first leg, a cross-piece extending across said hopper, and a portion of said cross-piece is disposed between said threaded member and said second leg such that cross-piece provides a stationary reference mark for said feed rate gauge.

9. A feeder for dispensing feed to livestock, comprising:

a hopper including a side wall and a bottom having a feed discharge aperture therethrough;

a deflector mounted in said hopper in vertically spaced covering relationship over said aperture and having a lower edge extending outwardly of said hopper bottom aperture and inwardly of said side wall;

a sweep member mounted for rotation between said deflector and said hopper bottom for sweeping feed to said aperture to discharge therethrough;

an adjustment mechanism operably associated with the deflector for adjusting the vertical spacing thereof over said hopper bottom, the egress of feed from the hopper being limited to flow through the aperture, whereby the rate flow in response to movement of the sweep member is dependent upon said vertical spacing between the deflector and the hopper bottom; and a feed rate gauge operably associated with said adjustment mechanism, said feed rate gauge comprising a plate member containing visual indicia indicative of a feed rate setting, said plate member being arranged to provide a visual indication of the vertical spacing between the deflector and the hopper bottom.

10. The feeder according to claim 9, wherein said adjustment mechanism comprising a threader member operably connected to said deflector, and said plate member is fixed to said threaded member, said plate member being movable with said threaded member as the vertical spacing of the deflector over the hopper bottom is adjusted.

11. The feeder according to claim 10, further comprising a cross-piece extending across said hopper, and wherein said threaded member extends through an opening in said cross-piece.

12. The feeder according to claim 11, wherein a portion of said cross-piece is disposed adjacent to a portion of said plate member containing said visual indicia, whereby said cross-piece provides a stationary reference mark of said feed rate gauge.

13. The feeder according to claim 11, wherein said plate member has a surface facing said cross-piece which is slidably engaged by said cross-piece to maintain a proper orientation of said visual indicia and to prevent rotation of said threaded member.

14. The feeder according to claim 10, wherein said adjustment mechanism comprises a handle having a threaded aperture threadably engaged on the threaded member, said handle having a grip portion disposed above said plate member adapted to be rotated by a user to effect vertical adjustment of said deflector.

15. A feeder for dispensing feed to livestock, comprising;

a hopper including a side wall and a bottom having a feed discharge aperture therethrough;

a deflector mounted in said hopper in vertically spaced covering relationship over said aperture and having a lower edge extending outwardly of said hopper bottom aperture and inwardly of said side wall;

a sweep member mounted for rotation between said deflector and said hopper bottom for sweeping feed to said aperture to discharge therethrough;

and adjustment mechanism operably associated with the deflector for adjusting the vertical spacing thereof over said hopper bottom, the egress of feed from the hopper being limited to flow through the aperture, whereby the rate of flow in response to movement of the sweep member is dependent upon said vertical spacing between the deflector and the hopper bottom; and a feed rate gauge operably associated with said adjustment mechanism, said feed rate gauge being arranged to provide a visual indication of the vertical spacing between the deflector and the hopper bottom; and said adjustment mechanism comprises a first threaded member extending through an opening in said cross-piece, and a rigid linkage connecting a lower end of said first threaded member to said deflector, said rigid linkage having at least one flat side extending along its length which is engageable by feed within the hopper to prevent rotation of said rigid linkage upon rotation of said sweep member.

16. The feeder according to claim 15, wherein said rigid linkage connecting the lower end of said first threaded member to said deflector comprises an elongate rigid connector member having a first end connected to the first threaded member and a second end connected to said deflector using a second threaded member.

17. The feeder according to claim 16, wherein said rigid linkage allows said deflector to rotate relative to said first threaded member.

18. A system for dispensing feed to livestock, said system comprising a plurality of feeders, each feeder comprising:
   a hopper including a side wall and a bottom having a feed discharge aperture therethrough;
   a deflector cone mounted in said hopper in vertically spaced relationship from said hopper bottom;
   an adjustment mechanism operably associated with the deflector cone for adjusting the vertical spacing thereof from said hopper bottom, whereby the rate of flow through the feeder is dependent upon said vertical spacing between the deflector cone and the hopper bottom; and
   a feed rate gauge operably associated with said adjustment mechanism said feed rate gauge comprising visual indicia indicative of the vertical spacing between the deflector cone and the hopper bottom, and a calibration means for adjusting a visual reading of the feed rate gauge while the deflector cone is maintained at a constant reference position, whereby each feeder in the system can be calibrated to provide the same feeding rate for a given feed rate gauge setting.

19. The system for dispensing feed according to claim 18, wherein said deflector cone is positioned closest to said hopper bottom in said reference position.

20. The system for dispensing feed according to claim 18, wherein said calibration means comprises a means for adjusting a vertical position of the visual indicia of the feed rate gauge relative to the deflector cone.

* * * * *